(12) United States Patent
Kim

(10) Patent No.: US 12,005,759 B2
(45) Date of Patent: Jun. 11, 2024

(54) MESH TYPE AIR VENT APPARATUS FOR VEHICLE

(71) Applicant: HYUNDAI MOBIS Co., Ltd., Seoul (KR)

(72) Inventor: Seung Cheol Kim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 338 days.

(21) Appl. No.: 17/574,870

(22) Filed: Jan. 13, 2022

(65) Prior Publication Data

US 2022/0227204 A1 Jul. 21, 2022

(30) Foreign Application Priority Data

Jan. 18, 2021 (KR) .................. 10-2021-0007079

(51) Int. Cl.
*B60H 1/00* (2006.01)
*B60H 1/34* (2006.01)

(52) U.S. Cl.
CPC ....... *B60H 1/00564* (2013.01); *B60H 1/3421* (2013.01); *B60H 2001/3464* (2013.01); *B60H 2001/3471* (2013.01)

(58) Field of Classification Search
CPC .. B60H 1/00564; B60H 1/3421; B60H 1/345; B60H 2001/3464; B60H 2001/3471; B60H 2001/3478
See application file for complete search history.

(56) References Cited

U.S. PATENT DOCUMENTS

2019/0047376 A1 2/2019 Demerath
2021/0260969 A1* 8/2021 Kim .................... B60H 1/3421

FOREIGN PATENT DOCUMENTS

| DE | 102009048677 A1 * | 5/2010 | ............. B60H 1/345 |
| DE | 102017118450 A1 | 2/2019 | |
| EP | 1359035 A2 * | 11/2003 | ............. B60H 1/345 |
| FR | 2912960 A1 * | 8/2008 | ............. B60H 1/345 |
| WO | WO-2005047033 A2 * | 5/2005 | ............. B60H 1/345 |

OTHER PUBLICATIONS

Currle, DE102009048677 (Year: 2010).*
Currle, EP1359035 (Year: 2003).*
Burghelle, FR2912960 (Year: 2008).*
Klingler, WO2005047033 (Year: 2005).*

* cited by examiner

*Primary Examiner* — Steven S Anderson, II
(74) *Attorney, Agent, or Firm* — Morgan, Lewis & Bockius LLP

(57) ABSTRACT

A mesh type air vent apparatus for a vehicle includes a duct including an open inlet and an open outlet, a mesh cover including a plurality of mesh holes communicating with the outlet of the duct, a wind direction adjusting wing provided in the duct and configured to laterally adjust a wind direction, air dampers disposed on upper and lower ends of the wind direction adjusting wing in the duct to selectively open or close gaps between the outlet of the duct and upper and lower ends of the mesh cover, and a link part which individually moves the air dampers in the duct in forward and backward directions.

14 Claims, 11 Drawing Sheets

MESH TYPE AIR VENT APPARATUS FOR VEHICLE

CROSS-REFERENCE TO RELATED APPLICATION

This application claims the benefit under 35 USC § 119(a) of Korean Patent Application No. 10-2021-0007079, filed on Jan. 18, 2021 in the Korean Intellectual Property Office, the entire disclosure of which is incorporated herein by reference for all purposes.

BACKGROUND

1. Field of the Invention

The present invention relates to a mesh type air vent apparatus for a vehicle.

2. Discussion of Related Art

In the recent vehicle market, many efforts to slim a structure of an air vent are being made in order to apply a next generation slim cockpit design, and as part of the efforts, various attempts are being made in consideration of design and function.

Particularly, in the next generation cockpit design, since it is not preferred for a wing of the air vent, which is still used the most, to be exposed to the outside, providing a knob, with which a wind direction of the wing may be adjusted manually, has also become virtually unnecessary.

Even without considering the design, there are many cases in which wind directly comes into contact with a passenger's body and causes inconvenience when a wing type air vent, whose wind direction is directly adjusted by a user, is used. Although there was a precedent in which a mesh type product with a plurality of holes formed to avoid the direct wind was released, in the structure in which the wind simply flows through mesh holes, since some problems, in that air resistance increases and there is no wind orientation, may be caused, it was difficult to satisfy a user's need to manipulate the wind.

SUMMARY OF THE INVENTION

The present invention is directed to providing a mesh type air vent apparatus for a vehicle, in which a mesh cover is applied to a front portion (duct outlet side) of an air vent to reduce a surrounding pressure so as to adjust a wind direction of windless (indirect) wind and which induces the occurrence of a Coanda effect using a skin surface to satisfy the needs of manipulating the wind direction of a user and allows a product upgrading strategy to be established.

In addition, the present invention is directed to providing a technology of adjusting opening and closing of a gap between an outlet of a duct and a mesh cover using an air damper operating in conjunction with a link joint structure so that indirect wind flows in a direction desired by a user.

Objectives to be achieved by the present invention are not limited to the above-described objectives, and other objectives, which are not described above will be clearly understood by those skilled in the art from the following descriptions.

According to an aspect of the present invention, a mesh type air vent apparatus includes a duct including an inlet and an outlet, a mesh cover including a plurality of mesh holes communicating with the outlet of the duct, a wind direction adjusting wing provided in the duct and configured to laterally adjust a wind direction, air dampers which are disposed on upper and lower ends of the wind direction adjusting wing in the duct and selectively open or close gaps between the outlet of the duct and upper and lower ends of the mesh cover, and a link part which moves the air dampers in the duct in forward and backward directions.

The upper and lower ends of the mesh cover may be spaced apart from the outlet of the duct to allow air introduced through the inlet of the duct to flow along a garnish extending from the outlet of the duct in upward and downward directions and to be discharged through the outlet.

The link part may include an upper arm connected to the air damper disposed on the upper end of the wind direction adjusting wing, a lower arm connected to the air damper disposed on the lower end of the wind direction adjusting wing, a connecting rod disposed between and connected to the upper arm and the lower arm, and link pins which connect an end portion of the upper arm, an end portion of the lower arm, and end portions of the connecting rod which are in contact with each other.

The connecting rod may include a link joint structure divided into a plurality of rods.

One end of the connecting rod may be fixed to the other end of the upper arm, and the other end of the connecting rod may be fixed to one end of the lower arm.

The upper arm and the lower arm may be provided with the connecting rod interposed therebetween and may be perpendicular to the connecting rod in different directions.

The link pins connected to the upper arm and the lower arm may be movable in link holes disposed in the upper and lower ends of the wind direction adjusting wing in the forward and backward directions. The mesh holes of the mesh cover may be disposed in a circular or diagonal shape in a mesh plate of the mesh cover.

The mesh type air vent apparatus may be configured to be disposed inside a dashboard in a vehicle, and configured to receive air from an air conditioner of the vehicle through the inlet and to discharge the air into the vehicle through the outlet.

The mesh cover may include a material the same as a material of a garnish of a board, which is adjacent to the outlet of the duct, in the vehicle.

According to another aspect of the present invention, there is provided a mesh type air vent apparatus for a vehicle including a duct including an inlet and an outlet, a mesh cover communicating with the outlet of the duct, a wind direction adjusting wing provided in the duct and configured to laterally adjust a wind direction, air dampers disposed on upper and lower ends of the wind direction adjusting wing in the duct, and a driving actuator configured to move the air dampers in the duct in forward and backward directions.

The air dampers may be disposed above and under the wind direction adjusting wing and may selectively open or close gaps between the duct and the mesh cover to guide air introduced through the inlet of the duct in one direction toward an upper or lower end of the mesh cover.

The air damper may include an upper damper positioned at an upper end in the duct and a lower damper positioned at a lower end in the duct, wherein a connecting link divided by a rotation shaft may be provided between the upper damper and the lower damper.

The connecting link may include an upper connecting bar hinge-connected to the upper damper and a lower connecting bar hinge-connected to the lower damper.

In this case, the upper connecting bar and the lower connecting bar may be hinge-connected by the rotation shaft, and the rotation shaft may be rotatably fixed to a designated section in the duct.

The inlet may be configured to communicate with an air conditioner of a vehicle and the outlet may be configured to direct the air into the vehicle.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clear with reference to the accompanying drawings and the following detailed embodiments. However, the present invention is not limited to the embodiments to be disclosed below but may be implemented in various different forms, the embodiments are provided in order to fully explain the present invention and fully explain the scope of the present invention for those skilled in the art, and the scope of the present invention is defined by the appended claims. Meanwhile, the terms used herein are provided to describe embodiments of the present invention and not for purposes of limitation. In the specification, unless the context clearly indicates otherwise, the singular forms include the plural forms. The terms "comprise" or "comprising" used in the specification specify some stated components, steps, operations and/or elements but do not preclude the presence or addition of one or more other components, steps, operations and/or elements.

Hereinafter, exemplary embodiments of the present invention will be described with reference to the accompanying drawings.

First Embodiment

Figure 1:
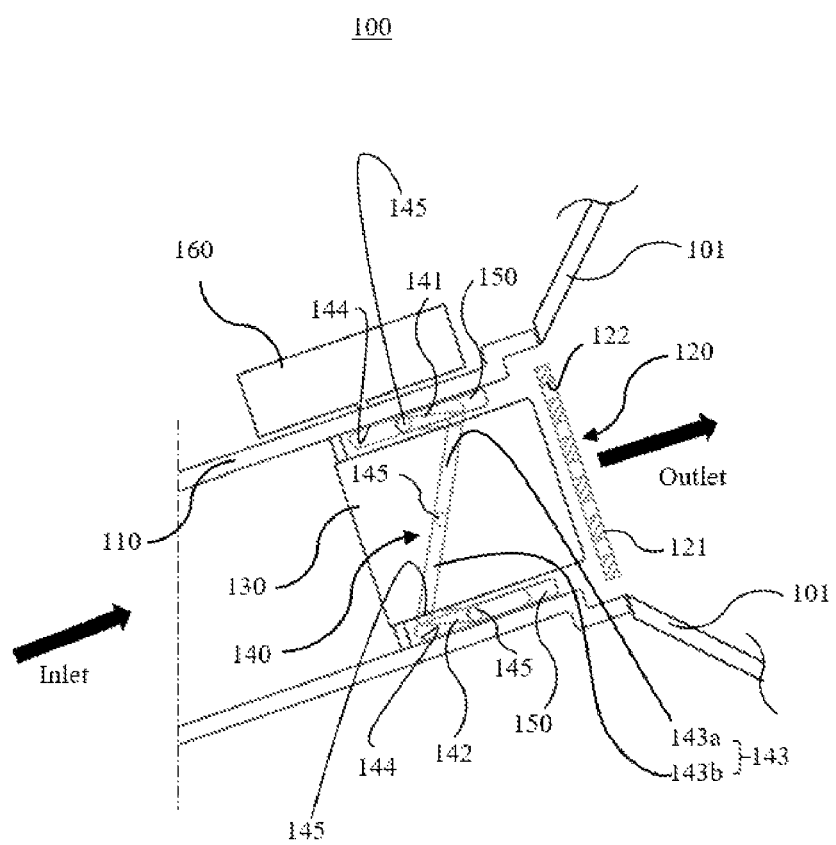
FIG. 1 is a schematic view illustrating a mesh type air vent apparatus for a vehicle according to a first embodiment of the present invention.

FIG. 1 is a schematic view illustrating a mesh type air vent apparatus for a vehicle according to one embodiment of the present invention.

Referring to FIG. 1, a mesh type air vent apparatus 100 for a vehicle according to one embodiment of the present invention is installed inside a dashboard in a vehicle and changes a mode of air introduced from a vehicle air conditioner (not shown) to a direct wind mode or indirect wind (windless) mode to guide the air into the vehicle.

In this case, the direct wind mode is a setting implemented to allow wind to directly flow to a user, and the indirect wind (windless) mode is a setting implemented to block wind in advance for a user who wants to avoid direct wind.

Generally, when the direct wind mode is used, it is absolutely necessary to avoid lateral wind direction interference due to a monitor (not shown), and when the indirect wind mode is used, since the wind direction interference avoidance is not necessary, a cover is just closed.

However, a first embodiment of the present invention proposes a mechanical mechanism capable of internally adjusting a wind direction for wind directivity.

To this end, a mesh type air vent apparatus 100 for a vehicle according to the first embodiment of the present invention includes a duct 110, a mesh cover 120, a wind direction adjusting wing 130, a link part 140, air dampers 150, and a driving actuator 160.

The duct 110 includes an inlet communicating with a vehicle air conditioner, an outlet directed into the vehicle, and an air path disposed between the inlet and the outlet.

The mesh cover 120 partially closes the outlet of the duct 110.

The mesh cover 120 includes a mesh plate 121 forming a body and mesh holes 122 formed to be spaced apart from each other in the mesh plate 121. The mesh hole 122 may communicate with the outlet of the duct 110 and may be formed as a plurality of mesh holes 122.

A direction of wind discharged into the vehicle may also be adjusted according to a layout of the mesh holes 122. That is, the mesh holes 122 may also be formed to be inclined in one direction in the mesh plate 121 to guide the direction of the wind. For example, the mesh holes 122 may be disposed in a circular or diagonal shape in the mesh plate 121.

Upper and lower ends of the mesh cover 120 are disposed to be spaced apart from the outlet of the duct 110, and air introduced from the inlet of the duct 110 flows along a garnish 101 extending from the outlet of the duct 110 in upward and downward directions and is discharged into the vehicle.

In this case, since the mesh cover 120 is formed of a material which is the same as a material of the garnish 101, which is close to the outlet of the duct 110, of a board in the vehicle, an exterior design can be improved, and a Coanda effect can be effectively induced.

The wind direction adjusting wing 130 may be provided in the duct 110 and may laterally adjust a wind direction of air discharged through the outlet of the duct 110.

The air dampers 150 are disposed in the duct 110. The air dampers 150 are disposed on upper and lower ends of the wind direction adjusting wing 130 and selectively open or close gaps between the outlet of the duct 110 and the upper and lower ends of the mesh cover 120.

The link part 140 has a structure which moves the air dampers 150 in the duct 110 in forward and backward directions. In this case, the forward direction means a direction toward the inlet of the duct 110, and the backward direction means a direction toward the outlet of the duct 110.

The link part 140 includes an upper arm 141, a lower arm 142, a connecting rod 143, and link pins 145.

The upper arm 141 is connected to the air damper 150 disposed on the upper end of the wind direction adjusting wing 130.

The lower arm 142 is connected to the air damper 150 disposed on the lower end of the wind direction adjusting wing 130.

The connecting rod 143 is disposed between and connected to the upper arm 141 and the lower arm 142. The connecting rod 143 may be formed to have a link joint structure divided into a plurality of rods. For example, one end of the connecting rod 143 is fixed to the other end of the upper arm 141, and the other end of the connecting rod 143 is connected to one end of the lower arm 142.

In this case, the upper arm 141 and the lower arm 142 may be disposed with the connecting rod 143 disposed therebetween and may be perpendicular to the connecting rod 143 in different directions. For example, the upper arm 141, the connecting rod 143, and the lower arm 142 may be connected in a "1" shape.

The link pins 145 connect an end portion of the upper arm 141, an end portion of the lower arm 142, and end portions of the connecting rod 143 which are in contact with each other. The link pins 145 may move in link holes 144 disposed in the upper and lower ends in the forward and backward directions.

Figure 2:
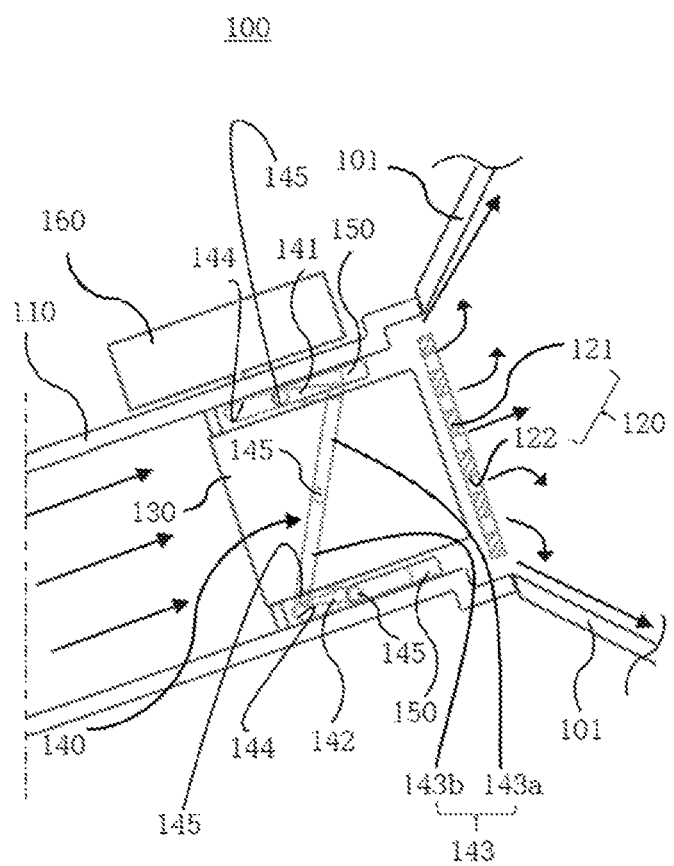
FIGS. 2 to 4 are views illustrating a state in which a wind direction of indirect wind is adjusted by forward and backward movement of an air damper in the mesh type air vent apparatus for a vehicle according to the first embodiment of the present invention.
Figure 3:
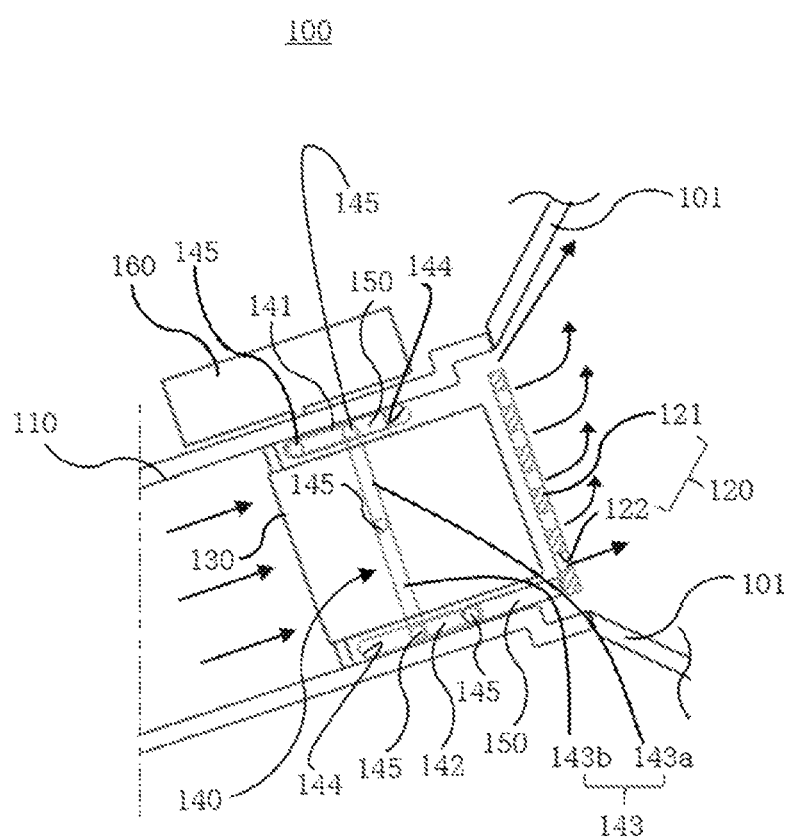
Figure 4:
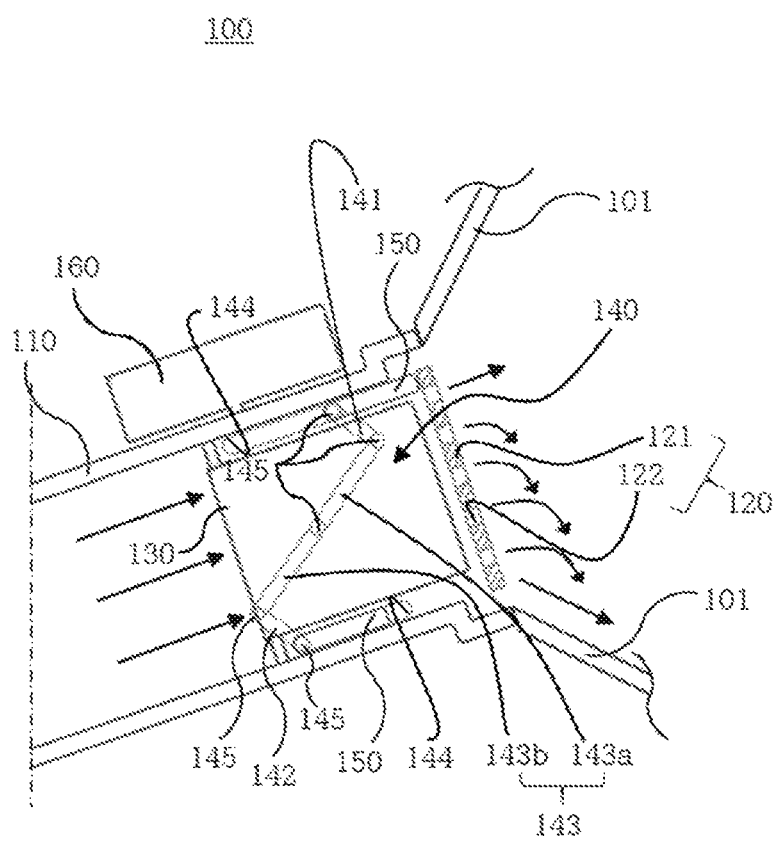

FIGS. 2 to 4 are views illustrating a state in which a wind direction of indirect wind is adjusted by forward and backward movement of the air damper in the mesh type air vent apparatus for a vehicle according to the first embodiment of the present invention.

Referring to FIGS. 2 to 4, in the structure of the mesh type air vent apparatus 100 for a vehicle, a phenomenon may occur in which a pressure in a wind region, in which a wind speed is high, decreases and wind is collected in the region.

A region from the outlet of the duct 110 to an upper end or a lower end of an end portion of the mesh cover 120 has a structural feature in which high speed wind is generated to allow low speed windless wind to follow the high speed wind. In such a structure of the mesh cover 120, a Coanda effect may be generated along a skin surface of the garnish 101. This means that wind direction performance is improved.

When the air damper 150 moves in the duct 110 in the forward and backward directions, a gap between the outlet of the duct 110 and the mesh cover 120 is opened or closed. That is, due to forward and backward movement of the air damper 150, in the indirect wind (windless) mode, directivity, which is a disadvantage of the mesh cover 120, may be generated.

The mesh type air vent apparatus 100 for a vehicle in FIG. 2 has the structure in which air flowing from the inlet of the duct 110 to the outlet thereof may flow into the vehicle through the mesh holes 122 of the mesh cover 120 and gaps above and under the mesh cover 120. Through this, the air discharged through the outlet of the duct 110 is diffused.

In the mesh type air vent apparatus 100 for a vehicle in FIG. 3, since the air damper 150 closes a gap between a lower end portion of the outlet of the duct 110 and a lower end portion of the mesh cover 120, air flowing from the inlet of the duct 110 toward the outlet thereof is discharged in the upward direction.

In the mesh type air vent apparatus 100 for a vehicle in FIG. 4, since the air damper 150 closes a gap between an upper end portion of the outlet of the duct 110 and an upper end portion of the mesh cover 120, air flowing from the inlet of the duct 110 toward the outlet thereof is discharged in the downward direction.

Figure 5:
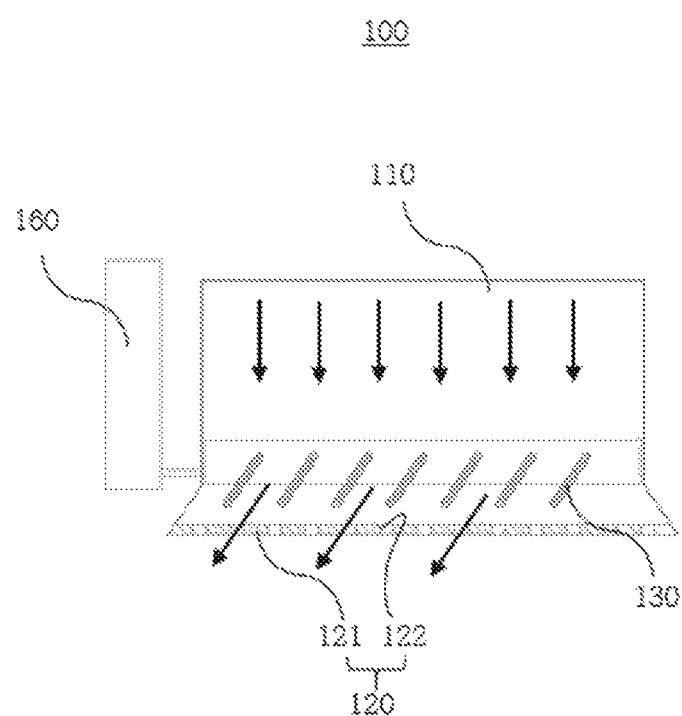
FIGS. 5 to 7 are views illustrating a state in which a wind direction of indirect wind flowing through a mesh cover is adjusted by lateral adjustment of a wind direction adjusting wing in the mesh type air vent apparatus for a vehicle according to the first embodiment of the present invention.
Figure 6:
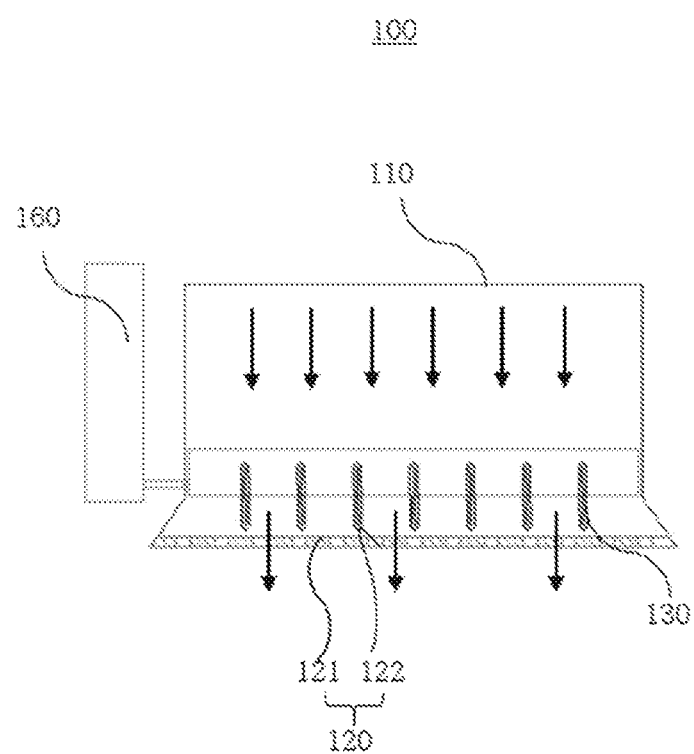
Figure 7:
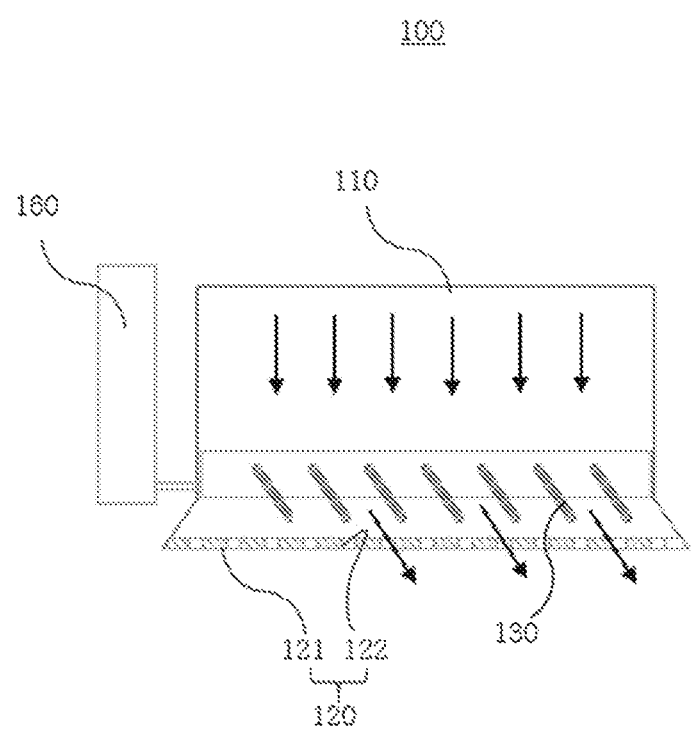

FIGS. 5 to 7 are views illustrating a state in which a wind direction of indirect wind flowing through the mesh cover is adjusted by lateral adjustment of the wind direction adjusting wing in the mesh type air vent apparatus for a vehicle according to the first embodiment of the present invention.

Referring to FIGS. 5 to 7, basically, since the mesh cover 120 partially closes the outlet of the duct 110, the indirect wind mode, which is similar to the windless mode, of the mesh type air vent apparatus 100 for a vehicle may be a basic mode thereof.

However, when the mesh cover 120 is close to the wind direction adjusting wing 130 and an angle of the wind direction adjusting wing 130 is electrically changed by the driving actuator 160 (see FIG. 1) to change a wind direction, the direct wind mode may be applied through the mesh holes 122 of the mesh cover 120.

Of course, since it is problematic for wind to flow to the user through the mesh holes 122 in the direct wind mode, as described above, the gap between the outlet of the duct 110 and the mesh cover 120 may be adjusted according to driving of the air damper 150 (see FIG. 1) so that the wind may flow in a direction desired by the user.

In this case, an important point is a set distance between the mesh cover 120 and the wind direction adjusting wing 130. When the set distance is greater than a set reference distance, air flowing into the vehicle through the mesh cover 120 is not affected by the wind direction adjusting wing 130.

In this case, since the wind direction adjusting wing 130 close to the mesh cover 120 affects a wind direction due to the mesh cover 120, when the mesh cover 120, to which a leftward wing having a size of about 3 mm is coupled, is applied to a front portion of the wind direction adjusting wing 130, a directivity angle of the wind direction adjusting wing 130 faces a right side, and air flowing into the vehicle through the mesh cover 120 may be adjusted to a leftward direction.

Second Embodiment

Figure 8:
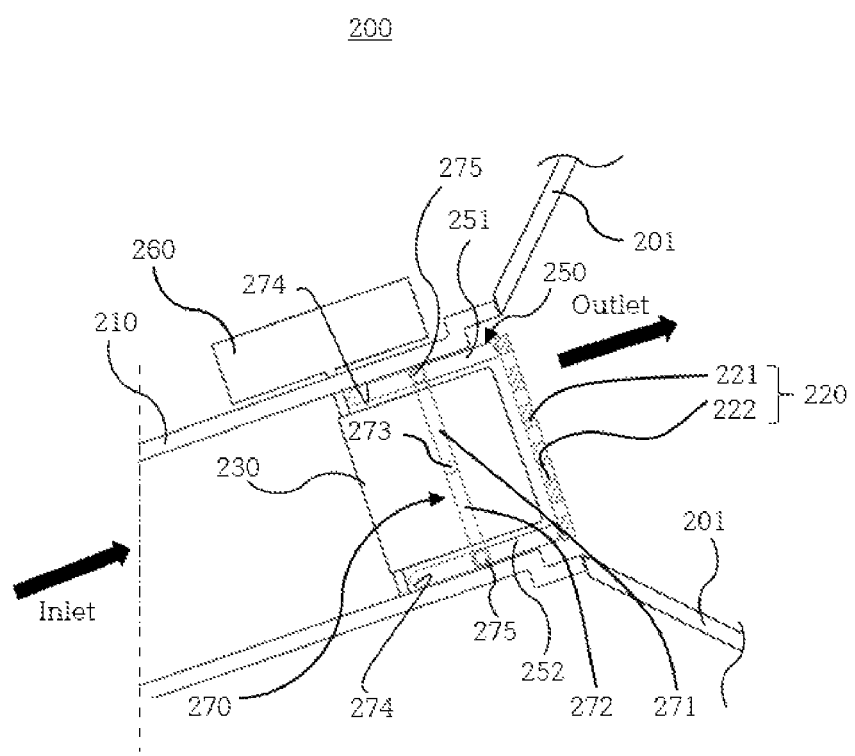
FIG. 8 is a schematic view illustrating a mesh type air vent apparatus for a vehicle according to a second embodiment of the present invention.

FIG. 8 is a schematic view illustrating a mesh type air vent apparatus for a vehicle according to a second embodiment of the present invention;

A mesh type air vent apparatus 200 for a vehicle illustrated in FIG. 8 includes a duct 210, a mesh cover 220, a wind direction adjusting wing 230, air dampers 250, a driving actuator 260, and a connecting link 270.

Regarding the above configuration, contents overlapping with the first embodiment will be omitted, and in the second embodiment, structural features different from those of the first embodiment will be described.

The air damper 250 includes an upper damper 251 positioned at an upper end in the duct 210 and a lower damper 252 positioned at a lower end in the duct 210.

The connecting link 270 divided by a rotation shaft 273 is positioned between the upper damper 251 and the lower damper 252.

The connecting link 270 includes an upper connecting bar 271, a lower connecting bar 272, the rotation shaft 273, link holes 274, and link pins 275.

The upper connecting bar 271 is hinge-connected to the upper damper 251.

The lower connecting bar 272 is hinge-connected to the lower damper 252.

The upper connecting bar 271 and the lower connecting bar 272 are hinge-connected by the rotation shaft 273. The rotation shaft 273 is formed in a structure rotatably fixed to a designated section in the duct 210. In this case, the designated section means a position at which the upper connecting bar 271 and the lower connecting bar 272 are rotatable about a position at which the rotation shaft 273 is fixed. In order to adjust a wind direction of air, it is advantageous for a rotation section of the rotation shaft 273 to be positioned in a driving radius of the wind direction adjusting wing 230 at an outlet side of the duct 210.

Figure 9:
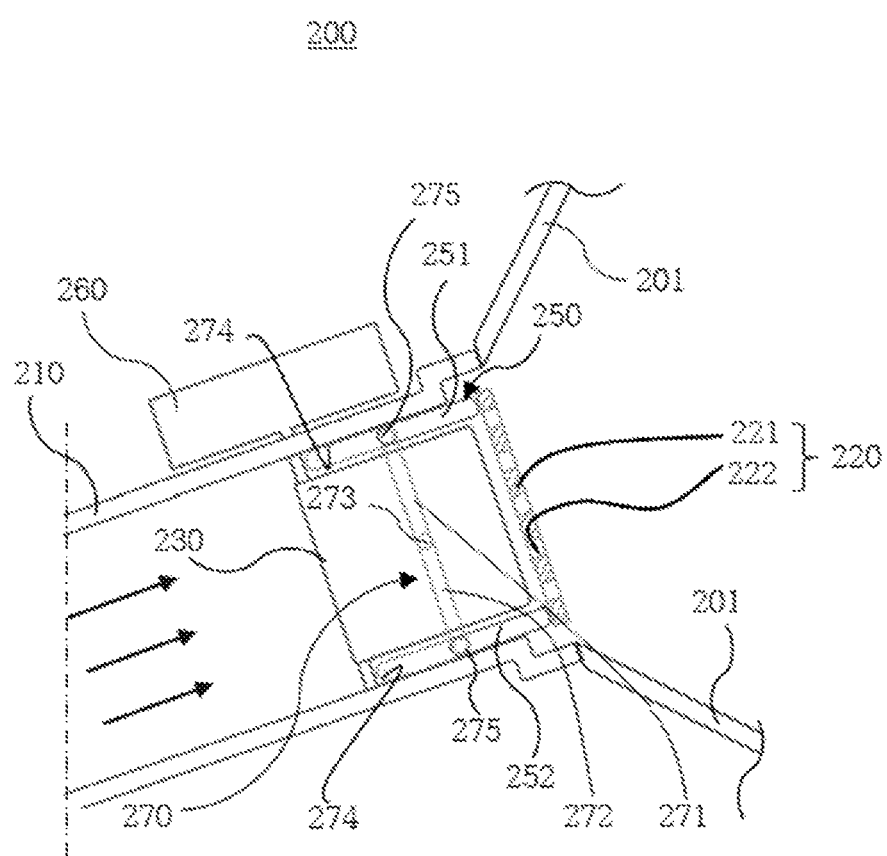
FIGS. 9 to 11 are views illustrating a state in which a wind direction of indirect wind is adjusted by forward and backward movement of an air damper in the mesh type air vent apparatus for a vehicle according to the second embodiment of the present invention.
Figure 10:
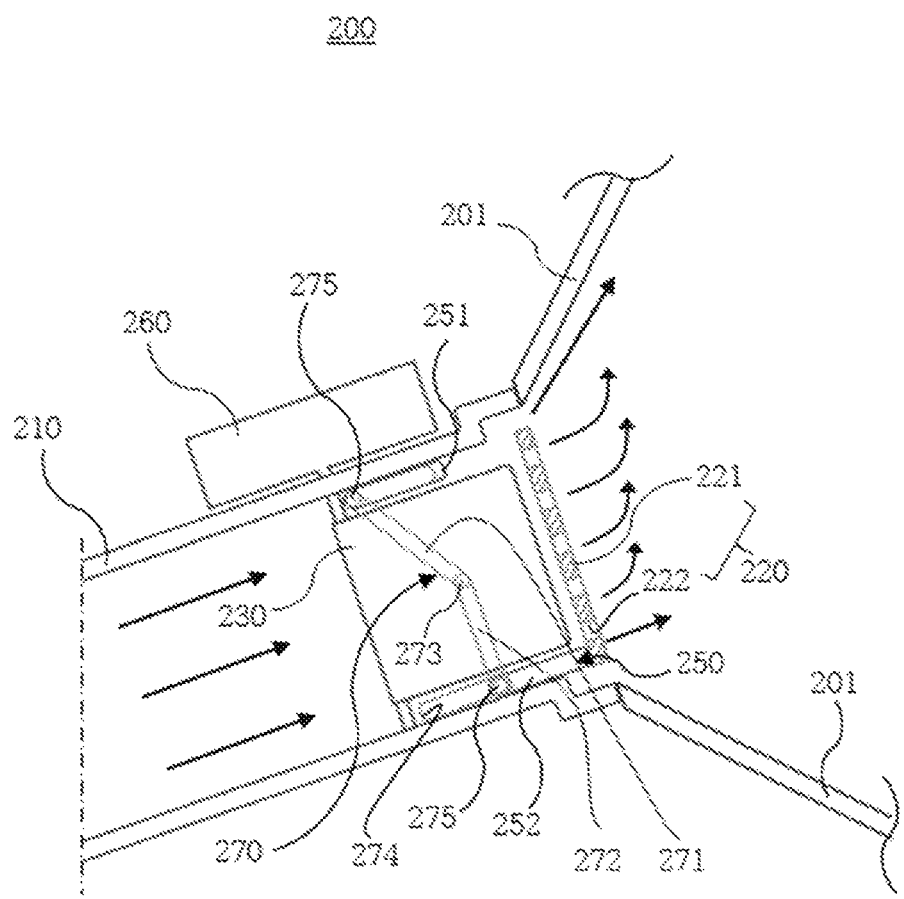
Figure 11:
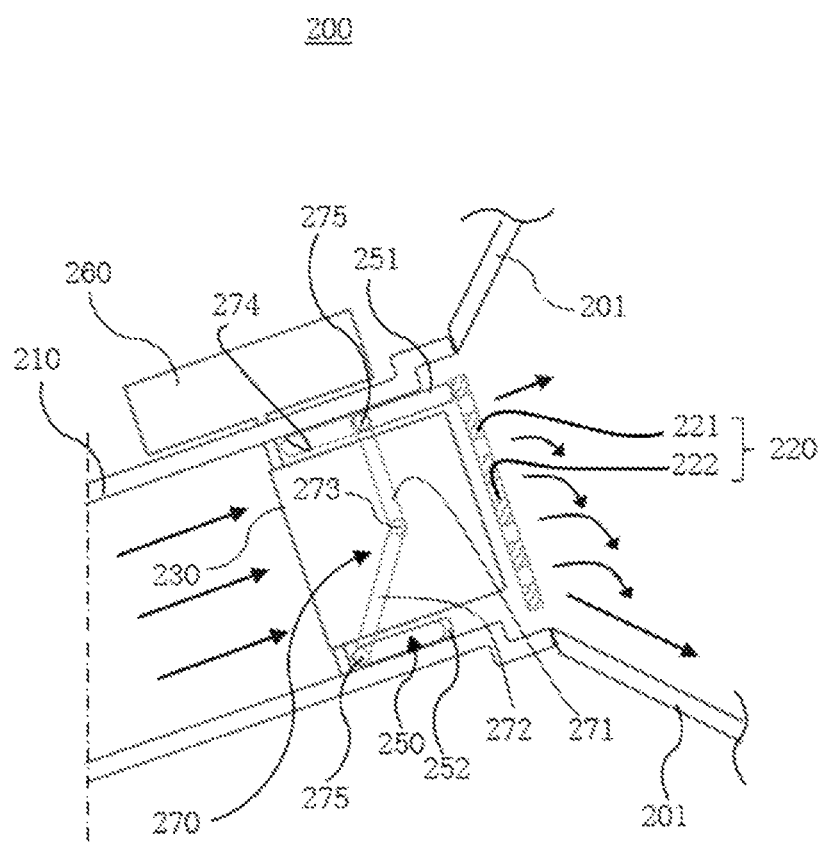

FIGS. 9 to 11 are views illustrating a state in which a wind direction of indirect wind is adjusted by forward and backward movement of the air damper in the mesh type air vent apparatus for a vehicle according to the second embodiment of the present invention.

Referring to FIGS. 9 to 11, a wind direction adjustment method of the mesh type air vent apparatus 200 for a vehicle according to the second embodiment of the present invention is basically similar to that of the first embodiment.

However, as illustrated in FIG. 9, a windless mode is different in that the upper damper 251 and the lower damper 252 of the air damper 250 completely close gaps between the outlet of the duct 210 and upper and lower ends of the mesh cover 220.

When the connecting link 270 rotates about the rotation shaft 273 and the upper connecting bar 271 and the lower connecting bar 272 move in forward and backward directions, the upper damper 251 and the lower damper 252 operating in conjunction therewith may move, and a direction of air flowing into the vehicle through gaps generated due to the movement and the mesh holes 222 may be determined.

In a mesh type air vent apparatus for a vehicle according to the present invention, since a mesh cover is applied to an outlet side of a duct through which wind is introduced into a vehicle, the marketability and functionality of a product can be improved, and thus an upgrading strategy of a next generation cockpit design can be established. Particularly, since the mesh type air vent apparatus for a vehicle is formed in a structure capable of inducing a Coanda effect using a skin surface, wind directivity can be improved.

In addition, in the mesh type air vent apparatus for a vehicle, since opening and closing of a gap between an outlet of the duct and the mesh cover is adjusted using an air damper operating in conjunction with a link joint structure, indirect wind flows in a direction desired by a user so that needs of manipulating a wind direction of the user can be satisfied.

The present invention is not limited to the above-described embodiments and may be variously modified and implemented within a range allowed by the technical spirit of the present invention.

What is claimed is:

1. A mesh type air vent apparatus, comprising:
a duct including an inlet and an outlet;
a mesh cover including a plurality of mesh holes communicating with the outlet of the duct;
a wind direction adjusting wing provided in the duct and configured to laterally adjust a wind direction;
air dampers which are disposed on upper and lower ends of the wind direction adjusting wing in the duct and selectively open or close gaps between the outlet of the duct and upper and lower ends of the mesh cover; and
a link part which moves the air dampers in the duct in forward and backward directions.

2. The mesh type air vent apparatus of claim 1, wherein the upper and lower ends of the mesh cover are spaced apart from the outlet of the duct to allow air introduced through the inlet of the duct to flow along a garnish extending from the outlet of the duct in upward and downward directions and to be discharged through the outlet.

3. The mesh type air vent apparatus of claim 1, wherein the link part includes:

an upper arm connected to the air damper disposed on the upper end of the wind direction adjusting wing;
a lower arm connected to the air damper disposed on the lower end of the wind direction adjusting wing;
a connecting rod disposed between and connected to the upper arm and the lower arm; and
link pins which connect an end portion of the upper arm, an end portion of the lower arm, and end portions of the connecting rod which are in contact with each other.

4. The mesh type air vent apparatus of claim 3, wherein the connecting rod includes a link joint structure divided into a plurality of rods.

5. The mesh type air vent apparatus of claim 3, wherein:
one end of the connecting rod is fixed to the other end of the upper arm; and
the other end of the connecting rod is fixed to one end of the lower arm.

6. The mesh type air vent apparatus of claim 5, wherein the upper arm and the lower arm are provided with the connecting rod interposed therebetween and are perpendicular to the connecting rod in different directions.

7. The mesh type air vent apparatus of claim 3, wherein the link pins connected to the upper arm and the lower arm are movable in link holes disposed in the upper and lower ends of the wind direction adjusting wing in the forward and backward directions.

8. The mesh type air vent apparatus of claim 1, wherein the mesh holes of the mesh cover have a circular or diagonal shape in a mesh plate of the mesh cover.

9. The mesh type air vent apparatus of claim 1, configured to be disposed inside a dashboard in a vehicle, and configured to receive air from an air conditioner of the vehicle through the inlet and to discharge the air into the vehicle through the outlet.

10. The mesh type air vent apparatus of claim 9, wherein the mesh cover includes a material the same as a material of a garnish of a board, which is adjacent to the outlet of the duct, in the vehicle.

11. A mesh type air vent apparatus, comprising:
a duct including an inlet and an outlet;
a mesh cover communicating with the outlet of the duct;
a wind direction adjusting wing provided in the duct and configured to laterally adjust a wind direction;
air dampers disposed on upper and lower ends of the wind direction adjusting wing in the duct; and
a driving actuator configured to move the air dampers in the duct in forward and backward directions,
wherein the air dampers are disposed above and under the wind direction adjusting wing and selectively open or close gaps between the duct and the mesh cover to guide air introduced through the inlet of the duct in one direction toward an upper or lower end of the mesh cover.

12. The mesh type air vent apparatus of claim 11, wherein the air damper includes:
an upper damper positioned at an upper end in the duct; and
a lower damper positioned at a lower end in the duct,
wherein a connecting link divided by a rotation shaft is provided between the upper damper and the lower damper.

13. The mesh type air vent apparatus of claim 12, wherein the connecting link includes:
an upper connecting bar hinge connected to the upper damper; and
a lower connecting bar hinge connected to the lower damper, wherein the upper connecting bar and the lower connecting bar are hinge-connected by the rotation shaft, and the rotation shaft is rotatably fixed to a section in the duct.

14. The mesh type air vent apparatus of claim 11, wherein the inlet is configured to communicate with an air conditioner of a vehicle and the outlet is configured to direct the air into the vehicle.

\* \* \* \* \*